United States Patent
Simionescu (10) Patent No.: US 10,756,630 B1
(45) Date of Patent: Aug. 25, 2020

(54) LINE DISCHARGE CIRCUIT WITH LOW POWER COMPONENTS

(71) Applicant: Microchip Technology Incorporated, Chandler, AZ (US)

(72) Inventor: Bogdan Simionescu, Bucharest (RO)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 0 days.

(21) Appl. No.: 16/583,414

(22) Filed: Sep. 26, 2019

Related U.S. Application Data (60) Provisional application No. 62/806,663, filed on Feb. 15, 2019.

(51) Int. Cl.
*H02M 3/158* (2006.01)
*H02M 1/32* (2007.01)

(52) U.S. Cl.
CPC ........... *H02M 3/1582* (2013.01); *H02M 1/32* (2013.01); *H02M 2001/322* (2013.01); *H02M 2001/327* (2013.01)

(58) Field of Classification Search
CPC ............. H02M 1/32; H02M 2001/322; H02M 2001/327; H02M 3/1582
See application file for complete search history.

(56) References Cited

U.S. PATENT DOCUMENTS

| | | | |
|---|---|---|---|
| 9,584,022 B1* | 2/2017 | Galvano | H02M 3/158 |
| 10,453,498 B2* | 10/2019 | Kuo | G11C 7/10 |
| 2014/0247000 A1 | 9/2014 | Schoenknecht | 318/400.27 |
| 2016/0211675 A1* | 7/2016 | Joehren | H02J 7/00711 |
| 2017/0338680 A1* | 11/2017 | Baier | H02M 3/1582 |
| 2020/0021256 A1* | 1/2020 | Terwal | H02M 3/158 |

FOREIGN PATENT DOCUMENTS

| | | | |
|---|---|---|---|
| EP | 2779452 A1 | 9/2014 | G05F 3/26 |
| EP | 3068022 A1 | 9/2016 | H02M 1/32 |
| EP | 3264578 A1 | 1/2018 | H02M 3/158 |

OTHER PUBLICATIONS

International Search Report and Written Opinion, Application No. PCT/US2019/066716, 10 pages, dated Mar. 26, 2020.

* cited by examiner

*Primary Examiner* — Thienvu V Tran
*Assistant Examiner* — Sisay G Tiku
(74) *Attorney, Agent, or Firm* — Slayden Grubert Beard PLLC (57) ABSTRACT

A control circuit includes a discharge circuit, a control logic, and an output. The output is communicatively coupled to a control terminal of a power transistor. The control circuit further includes an input communicatively coupled to an input of the transistor. In a discharge mode of operation, the control logic is configured to provide a control terminal voltage to the control terminal of the power transistor via the output. The control terminal voltage is configured to operate the power transistor linearly to dissipate energy stored in a capacitance connected to an input of the power transistor/In the discharge mode, the discharge circuit is configured to receive a discharge current from an output of the power transistor, and to dissipate remaining energy undissipated by the power transistor.

20 Claims, 4 Drawing Sheets

LINE DISCHARGE CIRCUIT WITH LOW POWER COMPONENTS

RELATED APPLICATIONS

This application claims priority to U.S. Provisional Patent Application No. 62/806,663 filed Feb. 15, 2019, the contents of which are hereby incorporated in their entirety.

FIELD OF THE INVENTION

The present disclosure relates to providing power in electronic devices and, more particularly, to a line discharge circuit with low power components.

BACKGROUND

Many electronic devices use power supplies. Such power supplies may be external or internal to the electronic device. The power supply may include a voltage regulator. The voltage regulator may be configured to generate a constant output voltage. The output voltage may be a direct current (DC) voltage. The output voltage may be generated using an input voltage. The voltage regulator may be configured to attempt to maintain a constant output voltage despite changes in input voltage or in a load attached to the voltage regulator. If the output voltage is less than the input voltage, the voltage regulator may be said to be implemented as a buck converter or operating in a buck mode. If the output voltage is greater than the input voltage, the voltage regulator may be said to be implemented as a boost converter or operating in boost mode. The voltage regulator may be implemented as a buck-boost converter, wherein it may operate in buck mode, boost mode, or in a buck-boost mode wherein both buck and boost components therein are in operation.

Capacitance may form on the input or on the output of a power supply. Some solutions may dissipate charge built up in this capacitance through linear solutions, such as a constant current discharge or a resistor discharge. However, such solutions may generate significant thermal energy, requiring additional thermal dissipation solutions to handle the thermal energy generated by the dissipated capacitance. Other solutions may include recuperative solutions, where current discharging the charge accumulated in the output capacitance is routed from the output capacitance to the input capacitance, or vice-versa. However, such solutions are complex since there may be a wide variance in input voltage based upon the capacitances. Still other solutions may include loss switching, wherein a low-side output switch of the buck-boost voltage regulator may be switched on and off to dissipate charge accumulated in the output capacitance. However, such solutions may require a very low frequency to allow an inductor of the voltage regulator to charge and discharge without becoming saturated.

Embodiments of the present disclosure address various shortcomings of other solutions to discharge the charge accumulated in input and/or output capacitances of voltage regulators as discussed above. Embodiments of the present disclosure may include power regulators that reduce the area on a die needed to dissipate power. Embodiments of the present disclosure may avoid the need for close-coupled thermal protection. Embodiments of the present disclosure may avoid significant increases in input voltage, operate without saturating the inductor. Embodiments of the present disclosure may operate without requiring additional pins on a semiconductor device implementing the power regulator.

SUMMARY

Embodiments of the present disclosure include a control circuit. The control circuit may include a discharge circuit. The discharge circuit may be implemented by any suitable combination of analog and digital circuitry. The control circuit may include control logic. The control logic may be implemented by any suitable combination of analog circuitry, digital circuitry, or instructions for execution by a processor. The control circuit may include a first output communicatively coupled to a control terminal of a first power transistor. The first power transistor may include the control terminal, a first terminal, and a second terminal. The first power transistor may be implemented by any suitable transistor. The control circuit may further include an input communicatively coupled to the second terminal of the first power transistor. In a discharge mode of operation, the control logic is configured to provide a first control terminal voltage to the control terminal of the first power transistor via the first output. The first control terminal voltage may be configured to operate the first power transistor in a linear region of operation to dissipate energy stored in a first capacitance connected to the first terminal of the first power transistor. In a discharge mode of operation, the discharge circuit may be configured to receive a discharge current from the second terminal of the first power transistor, and dissipate remaining energy undissipated by the first power transistor.

In combination with any of the above embodiments, the first power transistor may be external to a die including the control circuit.

In combination with any of the above embodiments, the second terminal of the first power transistor may be a source of the first power transistor.

In combination with any of the above embodiments, the discharge circuit may be configured to dissipate less energy than the first power transistor is configured to dissipate during operation in the linear region.

In combination with any of the above embodiments, the discharge circuit may include a current source and a pair of transistors configured to mirror a reference current to dissipate the remaining energy. The current source may be connected to the pair of transistors through a switch. The switch may be driven by a discharge signal from the control logic. The pair of transistors may include a third and a fourth transistor. The third transistor may include a first terminal and a control terminal connected to the current source, and a third terminal connected to ground. The fourth transistor may include a first terminal connected to the input of the discharge circuit, a control terminal connected to the current source, and a second terminal connected to ground.

In combination with any of the above embodiments, the discharge circuit may include a resistor configured to dissipate the remaining energy. The resistor may be connected to input of the discharge circuit. The resistor may be connected to input of the discharge circuit through a switch. The switch may be driven by a discharge signal from the control logic In combination with any of the above embodiments, the control circuit may include a second output communicatively coupled to a control terminal of a second power transistor, the second power transistor including the control terminal, a first terminal, and a second terminal.

The input may be further communicatively coupled to the second terminal of the second power transistor through an inductor.

In the discharge mode of operation, the control logic may be further configured to provide a second control terminal voltage to the control terminal of the second power transistor, the second control terminal voltage configured to operate the second power transistor in the linear region of operation to dissipate energy stored in a second capacitance connected to a first terminal of the second power transistor. The received discharge current may include components from the output of the first power transistor and the output of the second power transistor, The discharge circuit may be further configured to dissipate remaining energy undissipated by the second power transistor.

In combination with any of the above embodiments, the control circuit may include a voltage source. The control terminal voltage may be provided by the control logic as originating from the voltage source. The voltage source may be a separate voltage source than a voltage source providing voltage to be converted or regulated by the control circuit. In another embodiment, the control circuit may include two separate such voltage sources, wherein different voltage sources are used to apply separate control terminal voltages for the first and second power transistors.

In combination with any of the above embodiments, the control circuit may be included in a system. The system may be, for example, a microcontroller, power regulator, voltage regulator, voltage supply, voltage controller, computer, mobile device, tablet, or any other suitable electronic device. The system may include a voltage source or may be communicatively coupled to a voltage source. The control circuit may be included in a power regulator circuit within the system. The power regulator may be configured to output a designated voltage and to maintain that designated voltage. The first power transistor may be an output transistor connected to voltage output of the power regulator or may be an input transistor connected to the voltage source of the power regulator. The output voltage may be provided to various parts of the system, such as peripherals on a microcontroller, outside the system, or to any suitable load. The capacitances may be an input capacitance or an output capacitance implemented by a capacitor connected in parallel with input voltage or output voltage of the power regulator.

In combination with any of the above embodiments, the control circuit may be connected to fifth and sixth power transistors. Output of the control circuit may be connected to the control terminals of the fifth and sixth power transistors. A first terminal of the fifth power transistor may be connected to input voltage that is to be regulated. A first terminal of the fifth power transistor may be connected to output voltage that is regulated. Second terminals of the fifth and sixth power transistors may be connected together and to input of the control circuit.

DETAILED DESCRIPTION

Figure 1:
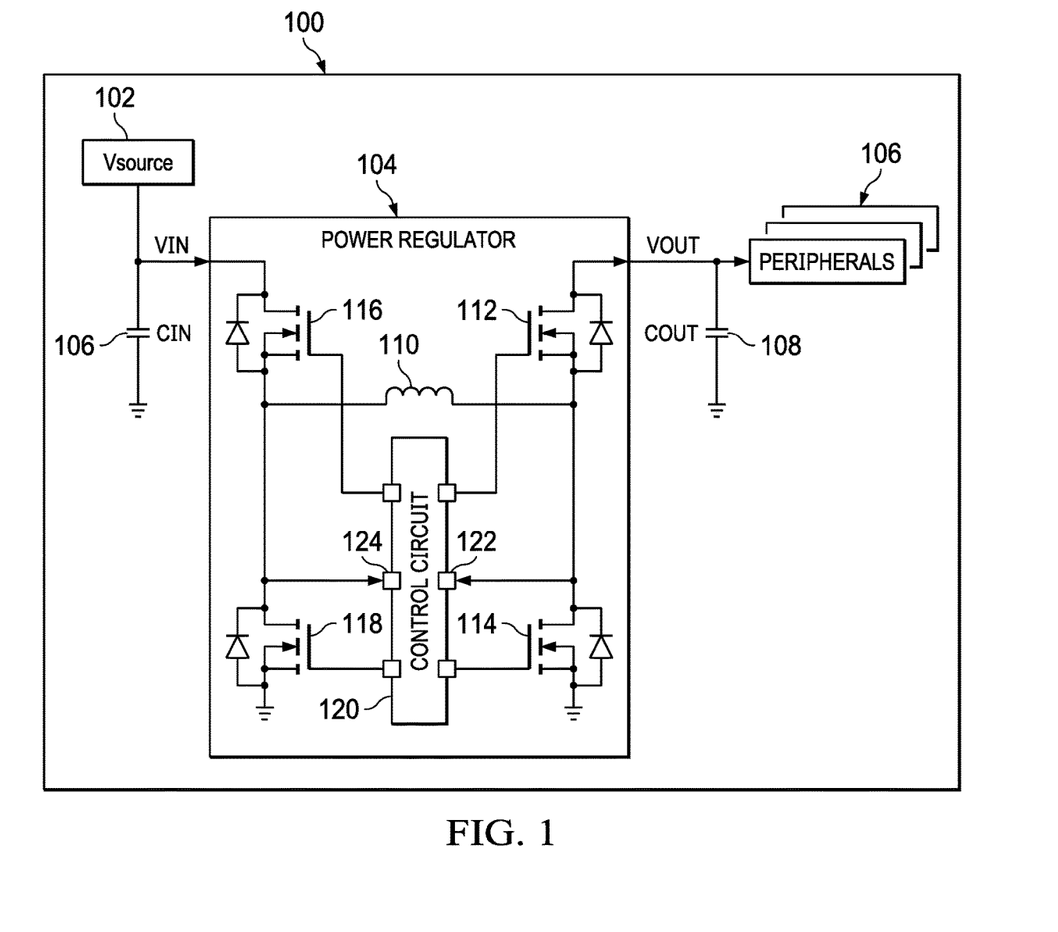
FIG. 1 is an illustration of a system configured to provide power regulation using a line discharge circuit with low power components, according to embodiments of the present disclosure.

FIG. 1 is an illustration of a system 100 configured to provide power regulation using a line discharge circuit with low power components, according to embodiments of the present disclosure. System 100 may be implemented as, or in, for example, a microcontroller, mobile device, computer, server, or any other suitable electronic device. System 100 may be configured to provide power from a source, such as Vsource 102, to various peripherals 106. Vsource 102 may include, for example, a direct current voltage source. The voltage of Vsource 102 may be fixed or programmable. Peripherals 106 may be implemented by any suitable circuit, electronic device, or subsystem that requires a power source. The voltage required by a given peripheral 106 may be different than the voltage available from Vsource 102. Accordingly, system 100 may include a power regulator 104 configured to convert a voltage level from Vsource 102 at its input, VIN, to a different voltage level at its output, VOUT. Voltage from VOUT may be provided to peripherals 106. VIN may be provided by any suitable power source or any other suitable portion of system 100.

Voltage regulator 104 may be configured to discharge input or output capacitances connected thereto. Voltage regulator 104 may include line discharge circuits configured to discharge input or output capacitances connected thereto. Discharge circuits may be implemented within the silicone or die of voltage regulator 104. Voltage regulator 104 may implement, for example, a four-switch buck-boost power controller or regulator, a universal serial bus (USB) power controller, another USB application, or a switched mode power supply (SMPS).

Voltage regulator 104 may be implemented as a buck-boost converter, and may be configured to provide a VOUT that is higher or lower than VIN, depending upon the needs of peripherals 106. Voltage regulator 104 may include an inductor 110, a high-side output transistor 112, a low-side output transistor 114, a high-side input transistor 116, and a low-side input transistor 118. Transistors 112, 114, 116, 118 may be implemented as, for example, n-channel power metal-oxide semiconductor field-effect transistors (MOSFET), n-channel vertical MOSFETs, bipolar transistors (BJTs), or any other suitable transistors or devices. In one embodiment, voltage regulator 104 may include a control circuit 120.

The drain or a first terminal of high-side output transistor 112 may be connected to VOUT, the source or a second terminal of high-side output transistor 112 may be connected to the drain of low-side output transistor 114, to a first side of inductor 110, and to an input 122 of control circuit 120. The gate (or control terminal) of high-side output transistor 112 may be connected to a respective output of control circuit 120. The source of low-side output transistor 114 may be connected to ground, and the gate (or control terminal) of transistor low-side output 114 may be connected to a respective output of control circuit 120. The drain or first terminal of high-side input transistor 116 may be connected to VOUT, the source or second terminal of high-side input transistor 116 may be connected to the drain of low-side input transistor 118 and to a second side of inductor 110, and the gate (or control terminal) of high-side input transistor 116 may be connected to control circuit 120. The source of low-side input transistor 118 may be connected to ground, and the gate (or control terminal) of low-side input transistor 118 may be connected to a respective output of control circuit 120. In one embodiment, the source or second terminal of high-side input transistor 116 may be connected to another input 124 of control circuit 120.

System 100 may include an input capacitance CIN 106 connected between VIN of power regulator 104 and ground. In one embodiment, CIN 106 may be included within power regulator 104. In another embodiment, CIN 106 may be implemented outside of power regulator 104. System 100 may include an output capacitance COUT 108 connected between VOUT of power regulator 104 and ground. In one embodiment, COUT 108 may be included within power regulator 104. In another embodiment, COUT 108 may be implemented outside of power regulator 104.

In one embodiment, power regulator 104 may be configured to dissipate power or charge located in CIN 106. In another embodiment, power regulator 104 may be configured to dissipate power or charge located in COUT 108. Although shown as a single entity, power regulator 104 may be implemented in a single entity or more than one entity to separately or in combination dissipate power or charge located in CIN 106 and COUT 108.

Compared to other solutions, power regulator 104 may be configured to reduce the large area needed to dissipate power, as other solutions may require additional power elements such as resistors or dedicated transistors in which power, which may be large, is dissipated. Such additional power elements require space on a semiconductor die for power regulator 104 in order to be implemented, and may require additional thermal dissipation or mitigation elements. Furthermore, compared to other solutions, power regulator 104 may be configured to dissipate power without a significant increase in input voltage or a risk to saturate inductor 110. In addition, compared to other solutions, power regulator 104 may be configured dissipate power without extra pins. For example, in other solutions, a resistor or dedicated transistor in which power is to be dissipated might not be included within power regulator 104, but may be connected externally to power regulator 104.

In one embodiment, control circuit 120 may be configured to operate power regulator 104 to dissipate power in high-side transistors of power regulator 104 such as high-side transistors 112, 116. Control circuit 120 may be configured to operate power regulator 104 to dissipate power from COUT 108 in high-side output transistor 112. Furthermore, control circuit 120 may be configured to operate power regulator 104 to dissipate power from CIN 106 in high-side input transistor 116. As control circuit 120 is configured to discharge capacitances present on input or output lines of power regulator 104, control circuit 120 may be a line discharge circuit. Control circuit 120 may be configured to drain power from capacitances by connecting a respective gate (or control terminal) of high-side transistors 112, 116 to a suitable low voltage source. The low voltage source connected to the respective gate (or control terminal) of high-side transistors 112, 116 may cause a current to be drawn from the capacitance connected to the respective drains or first terminals of high-side transistors 112, 116. The respect current may flow through the channel of the respective one of high-side transistors 112, 116 to be discharged. As a result, most of the energy to be dissipated is dissipated in high-side transistors 112, 116, with the balance of the energy to be dissipated in control circuit 120 through input 122 or input 124.

In one embodiment, energy from CIN 106 may be dissipated in high-side transistor 116, with the balance of the energy to be dissipated in control circuit 120 through input 122 after passing through inductor 110. In another embodiment, energy from CIN 106 may be dissipated in high-side transistor 116, with the balance of the energy to be dissipated in control circuit 120 through input 124.

In one embodiment, energy from COUT 108 may be dissipated in high-side transistor 112, with the balance of the energy to be dissipated in control circuit 120 through input 124 after passing through inductor 110. In another embodiment, energy from COUT 108 may be dissipated in high-side transistor 112, with the balance of the energy to be dissipated in control circuit 120 through input 122.

Although transistors 112, 114, 116, 118 are discussed above as implemented by n-channel power MOSFETs, transistors 112, 114, 116, 118 may be implemented by any suitable transistor. When transistors 112, 114, 116, 118 are implemented by other types of transistors, a given connection to, for example, a drain pin may instead be to a source pin. Other implementations of transistors 112, 114, 116, 118 may cause other changes to the particular arrangement of elements in FIG. 1 without departing from the scope and teachings of the present disclosure.

Example implementations of power regulator 104 are shown below within the context of FIGS. 2-4.

Figure 2:
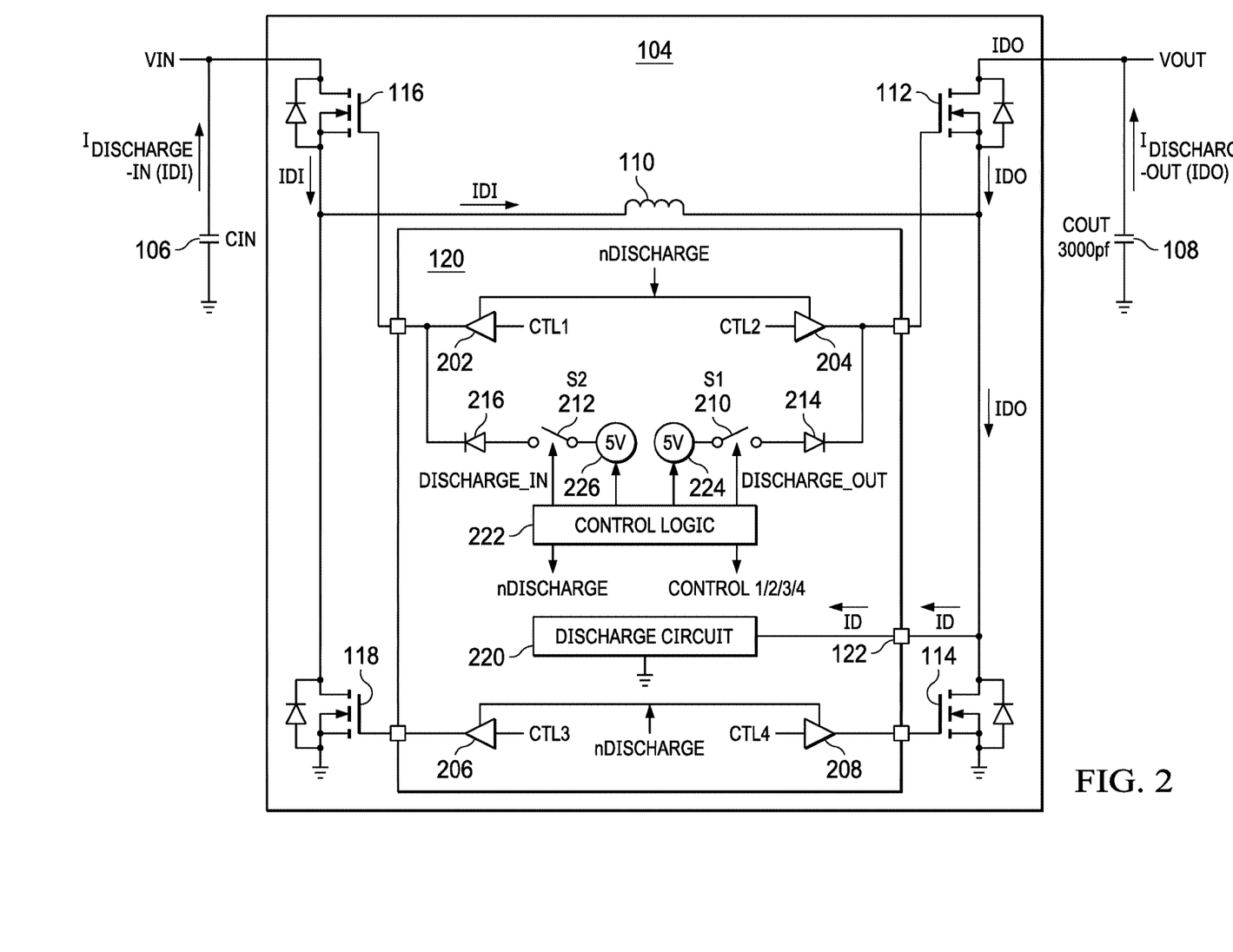
FIG. 2 is a more detailed illustration of a system configured to provide power regulation using a line discharge circuit with low power components, according to embodiments of the present disclosure.

FIG. 2 is a more detailed illustration of system 100, according to embodiments of the present disclosure. In particular, further details of control circuit 120 and the flow of current during discharge modes of operation of system 100 are illustrated in FIG. 2. A discharge mode may include operation wherein CIN 106 or COUT 108 are discharged. System 100 may enter a discharge mode at any suitable time or upon any suitable criteria. The discharge of COUT 108 may be initiated when the power delivery of power regulator 104 is stopped. The power delivery of power regulator 104 may be stopped automatically or by an external controller. The discharge of CIN 106 may be initiated when Vsource 102 is no longer available, such as in a system powered by USB after disconnection. In the discharge mode, CIN 106, COUT 108, or both may be discharged. CIN 106 and COUT 108 may be separately discharged even if both are to be discharged. In such a case, CIN 106 and COUT 108 be separately discharged in any suitable order.

Control signals for control circuit 120 may be generated in any suitable manner. In one embodiment, control circuit 120 may include control logic 222 to generate control signals. Control logic 222 may be configured to generate control signals on the basis of any suitable criteria. Control logic 222 may be implemented in any suitable manner, such as with analog circuitry, digital circuitry, instructions for execution by a processor, or any combination thereof. Control logic 222 may be configured to generate control signals such as CTL1, CTL2, CTL3, CTL4, DISCHARGE (not shown), nDISCHARGE, DISCHARGE_OUT, and DISCHARGE_IN.

Control circuit 120 may include drivers 202, 204, 206, 208, connected respectively to the gates (or control terminals) of transistors 116, 112, 118, 114. Drivers 202, 204, 206, 208 may be driven by respective control signals, CTL1, CTL2, CTL3, CTL4, each generated by control logic 222. CTL1, CTL2, CTL3, CTL4 may be enabled during a normal (non-discharge) mode or operation of power regulator 104 to alternately activate (or close) and deactivate (or open) transistors 116, 112, 118, 114 to provide a continuous VOUT. During a discharge mode of operation, drivers 202, 204, 206, 208 may be turned off, made inoperable, or otherwise disregarded. Control circuit 120 may include any suitable mechanism for turning off, making inoperable, or otherwise disregarding control signals generated by drivers 202, 204, 206, 208. For example, control circuit 120 may include a control signal, nDISCHARGE, which may be a logical inverse of a DISCHARGE control signal (as indicated above, DISCHARGE is not shown in FIG. 2). The DISCHARGE control signal, when logically high or on, may specify that control circuit 120 is to operate in a discharge mode of operation to drain power from COUT 108 or CIN 106. The DISCHARGE control signal, when logically low or off, may specify that control circuit 120 is to operate in a normal mode of operation to control transistors 116, 112, 118, 114 to provide VOUT. Thus, the nDISCHARGE control signal, when logically high or on, may be used to enable, power, or otherwise allow drivers 202, 204, 206, 208 to issue control signals to transistors 116, 112, 118, 114. Furthermore, when control circuit 120 is to enter a discharge mode of operation, the nDISCHARGE control signal may be logically low or off, and disable drivers 202, 204, 206, 208.

During a discharge mode of operation, low-side transistors 118, 114 may be off responsive to an off state of the nDISCHARGE control signal. However, during a discharge mode of operation, high-side transistors 116, 112 may be in various states of operation, depending upon control signals provided by control circuit 120. Control circuit 120 may be configured to issue control signals to control the gate (or control terminal) of transistors high-side 116, 112 during the discharge mode of operation. Control circuit 120 may include any suitable number and kind of elements in order to control the gates of high-side transistors 116, 112.

For example, control circuit 120 may include first voltage source 224. First voltage source 224 may be configured to generate a logic high signal. Such a logic high signal may be, for example, five volts. The signal generated by first voltage source 224 may be a logic high signal as originally generated and after being passed through a diode such as diode 214. In one embodiment, control circuit 120 may include a single instance of a voltage source such as first voltage source 224, configured to provide gate (or control terminal) voltages to both high-side transistors 112, 116. In another embodiment, as shown in FIG. 2, control circuit 120 may include a second voltage source 226. Second voltage source 226 may be configured to generate a logic high signal. Such a logic high signal may be, for example, five volts. The signal generated by voltage source 224 may be a logic high signal as originally generate and after being passed through a diode such as diode 216. In such an embodiment, first voltage source 224 may be configured to provide a gate (or control terminal) voltage to high-side output transistor 112, and second voltage source 226 may be configured to provide a gate (or control terminal) voltage to high-side input transistor 116. The voltages of first and second voltage sources 224, 226 may be the same or different, and may be independently controlled by control logic 222.

Control circuit 120 may include a switch S2 212 between second voltage source 226 and the gate (or control terminal) of high-side input transistor 116, wherein the connection between voltage source 226 and the gate (or control terminal) of high-side input transistor 116, which switch S2 212 is closed, is through diode 216. Switch S2 212 may be controlled by the control signal DISCHARGE_IN. DISCHARGE_IN may be enabled by control logic 222 when CIN 106 is to be discharged in a given discharge mode. Control circuit 120 may include a switch S1 210 between first voltage source 224 and the gate (or control terminal) of high-side output transistor 112, wherein the connection between voltage source 224 and the gate (or control terminal) of high-side output transistor 112, when switch S1 210 is closed, is through diode 214. Switch S1 210 may be controlled by the control signal DISCHARGE_OUT. DISCHARGE_OUT may be enabled by control logic 222 when COUT 108 is to be discharged in a given discharge mode. When DISCHARGE_IN is enabled or a logic high, switch S2 212 may be enabled and thus route the voltage from second voltage source 226 through diode 216 to the gate (or control terminal) of high-side input transistor 116. When DISCHARGE_OUT is enabled or a logic high, switch S1 210 may be enabled and thus route the voltage from first voltage source 224 through diode 214 to the gate (or control terminal) of high-side output transistor 112. During a discharge mode, when high-side input transistor 116 is enabled through application of voltage from second voltage source 226, capacitor CIN 106 may be discharged. During a discharge mode, when high-side input transistor 112 is enabled through application of voltage from first voltage source 224, capacitor COUT 108 may be discharged.

Any suitable discharge mode or discharge modes may be used by control circuit 120. In one embodiment, CIN 106 may be discharged during a first discharge mode. In another embodiment, COUT 108 may be discharged during a second discharge mode. In yet another embodiment, CIN 106 and COUT 108 and may both be discharged during a third discharge mode.

During a discharge of COUT 108, current may flow from a top plate of COUT 108 into the drain or first terminal of high-side output transistor 112. This discharge current may be given as IDO. IDO may be routed into a discharge circuit 220 included within control circuit 120 through input 122. During a discharge of CIN 106, current may flow from a top plate of CIN 106 into the drain or first terminal of high-side input transistor 116. This discharge current may be given as IDI. IDI may be routed into discharge circuit 220 through inductor 110 and then through input 122. The current routed into discharge circuit 220 through input 122 is denoted as ID. If the discharge mode being used by control circuit 120 is to discharge COUT 108 alone, then ID may be equal to IDO. If the discharge mode being used by control circuit 120 is to discharge CIN 106 alone, then ID may be equal to IDI. If the discharge mode being used by control circuit 120 is to discharge CIN 106 and COUT 108, then ID may be equal to the sum of IDI and IDO. Alternatively, by the symmetry of the circuit, discharge circuit 220 may be connected only to the source of the high side input transistor 116. Then, the discharge current of COUT 108, IDO, may then flow through transistor 112, inductor 110 into discharge circuit 220.

During the discharge modes, a relatively large amount of energy may be dissipated in high-side transistors 112, 116. The voltage to be applied to the gates of high-side transistors 112, 116 may be selected according to expected voltages at the drain (or first terminal) and source (or second terminal) of each respective one of high-side transistors 112, 116. In particular, the voltage to be selected so that high-side transistors 112, 116 operate within a linear region of operation. The operation within the linear region may dissipate a substantial amount of the discharge energy across high-side transistors 112, 116. The specific range of the linear region of operation may depend upon the particular type and model of transistor that is used to implement high-side transistors 112, 116. Accordingly, the voltage to be selected so that high-side transistors 112, 116 operate within a linear region of operation may be dependent upon the particular type and model of transistor that is used to implement high-side transistors 112, 116. In order to provide such a voltage to be applied to the gates of high-side transistors 112, 116, any suitable mechanism may be used. For example, voltage sources 224, 226 may be 5V, which may be further attenuated by one or more diodes, such as diodes 214, 216, such that the particular gate (or control terminal) voltage to be applied to high-side transistors 112, 116 will cause transistors high-side 112, 116 to operate within a linear region of operation in view of the drain and source voltages thereof.

The energy to be dissipated during a respective discharge mode by high-side transistors 112, 116 may be large compared to the amount of energy to be dissipated by discharge circuit 220. By utilizing high-side transistors 112, 116 to dissipate a large amount of energy from capacitors COUT 108, CIN 106, implementation of discharge circuit 220 may be made using fewer components. Discharge circuit 220 may be implemented in any suitable manner and by any suitable number, kind, and combination of components. Example, non-limiting implementations of discharge circuit 220 are shown in FIGS. 3 and 4. Discharge circuit 220 may be implemented in any fixed or adjustable implementation.

However, compared to other solutions, discharge circuit 220 may be implemented with relatively few components. In particular, discharge circuit 220 may be implemented with dissipation elements that will not generate excessive heat within power regulator 104 or control circuit 120. This may be advantageous as compared to prior-art solutions which may require adding a line capacitance discharge block with a high silicon area, extra heat sinking, extra thermal protection, or other elements that will also add to device cost and size.

Figure 5:
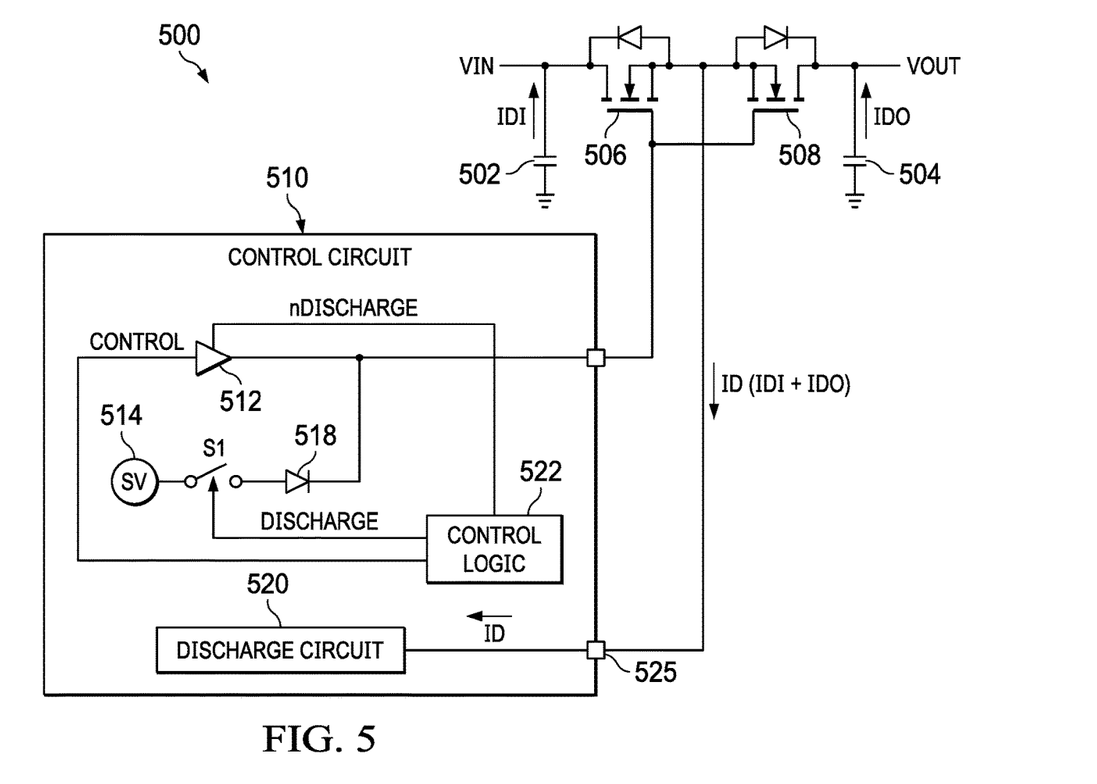
FIG. 5 is an illustration of another system configured to provide power regulation using a line discharge circuit with low power components, according to embodiments of the present disclosure.

For example, in FIG. 2, VOUT may be 20 V. COUT 108 may be 3000 pF. During a discharge mode for COUT 108, IDO may be 110 mA. The voltage to be dissipated may thus be 2.2 W. By operating high-side output transistor 112 in its linear operation region, high-side output transistor 112 may be configured to dissipate 1.925 W. Thus, the voltage at the source of high-side output transistor 112, and at input 122, may be 2.5 V. Accordingly, discharge circuit 220 might only need to dissipate 275 mW. Thus, discharge circuit 220 may be configured to dissipate less energy than high-side output transistor 112 during linear operation of high-side output transistor 112. The gate (or control terminal) voltage applied to high-side output transistor 112 may be the voltage of first voltage source 224, 5 V, less the voltage drop across diode 214, 0.7 V, resulting in 4.3 V applied to the gate (or control terminal) of high-side output transistor 112. The combination of the gate (or control terminal) voltage being 4.3 V and the source voltage being 2.5 V may cause high-side output transistor 112 to operate in a linear region of operation. A similar operation may be performed to discharge CIN 106 so as to dissipate a portion of the discharge energy across high-side input transistor 116. Diodes 214, 216 may be optional, as well as diode 518 of FIG. 5, shown further below. These diodes may reduce a cost of design and production of discharge circuit 220.

Figure 3:
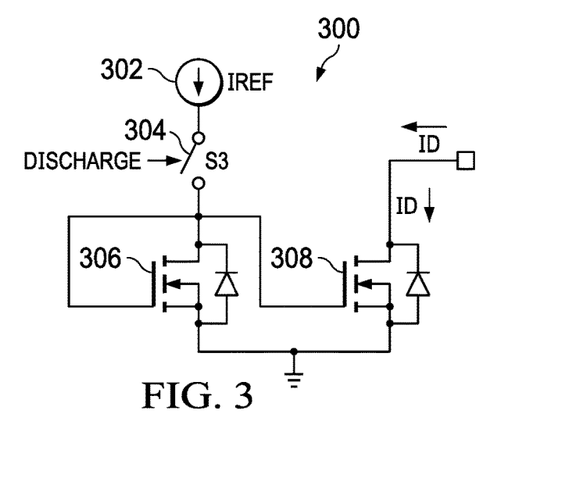
FIG. 3 is an illustration of an implementation of a discharge circuit, according to embodiments of the present disclosure.

FIG. 3 is an illustration of an implementation of a discharge circuit 300, according to embodiments of the present disclosure. Discharge circuit 300 may implement discharge circuit 220. In one embodiment, discharge circuit 300 may receive ID from one or more of high-side transistors 112, 116 through input 122. In another embodiment, discharge circuit 300 may receive ID from one or more of high-side transistors through input 124 (not shown). ID may represent the current to be dissipated after some portions of the energy of the capacitors have already been dissipated by one or more of transistors high-side 112, 116. Discharge circuit may include a transistor arrangement. The transistor arrangement may include transistors 306, 308.

The input, ID, may be connected to the drain of first transistor 308. The source of the first transistor 308 may be connected to ground. Discharge circuit 300 may include second transistor 306. The gate (or control terminal) of first transistor 308, the gate (or control terminal) of first transistor 306, and the drain of second transistor 306 may each be switchably connected to a current source 302. Current source 302 may be a constant current reference source given by value IREF. Current source 302 may be applied to transistors 306, 308 when control circuit 120 is operating in a discharge mode. Accordingly, discharge circuit 300 may include a switch S3 304. Switch S3 304 may be controlled by the DISCHARGE signal. Discharge circuit 300 may be configured to, when control circuit 120 is operating in a discharge mode, dissipate energy defined by the voltage drops of transistors 306, 308. During the discharge mode, transistors 306, 308 may be configured to operate in the linear region. Current source 302 may flow through second transistor 306 and be multiplied in first transistor 308, acting as a mirror transistor. The current flow through first transistor 308 may approximate, in this example, 110 mA, the same as ID if the discharge mode is to discharge COUT 108 alone. A combination of high-side output transistor 112 and first transistor 308 may form a cascode.

This example implementation of discharge circuit 300 might only use low power components and thus dissipate small amounts of power. This example implementation of discharge circuit 300 may thus be easier to integrate in a small silicon area or a small implementation of a die for control circuit 120. Discharge circuit 300 might not require thermal protection while still effectively discharging line voltages in a variety of situations. For example, in a USB application, USB power delivery may have a worst-case condition of a 3000 pF capacitor charged to 20V that must be discharged to below 0.5 V in less than 600 milliseconds. Other implementations of discharge circuit 300, such as using a resistor to dissipate energy, might be able to dissipate a peak of 6 W using only discharge circuit 300. Yet another implementation using a constant current discharge might be able to dissipate heat of 2.2 W. However, because of the dissipation of energy by high-side transistors 112, 116 in system 100, the dissipation of energy in discharge circuit 300 by transistors 306, 308 within the range of 200 to 300 mW may be sufficient. In some cases, the dissipation of energy by high-side transistors 112, 116 during a discharge mode may be less energy than a normal operation of providing power by voltage regulator 104, and thus no additional thermal considerations may be required.

If high-side transistors 112, 116 are implemented on a same semiconductor device or die as discharge circuit 300, then the dissipation of energy in a discharge mode may however require additional thermal protection.

Figure 4:
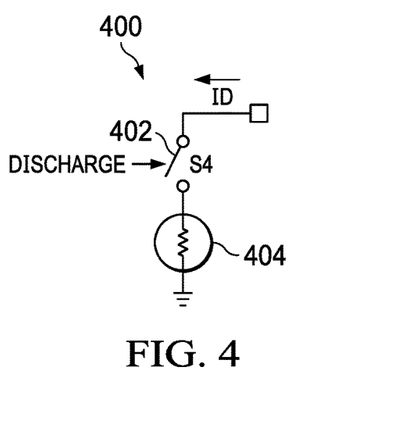
FIG. 4 is an illustration of an implementation of another discharge circuit, according to embodiments of the present disclosure.

FIG. 4 is an illustration of an implementation of another discharge circuit 400, according to embodiments of the present disclosure. Discharge circuit 400 may implement discharge circuit 220. Discharge circuit 400 may operate similarly to discharge circuit 300. Discharge circuit 400 may include a switch S4 402 connected to a resistor 404. Switch S4 402 may be controlled by the DISCHARGE signal.

Returning to FIG. 2, voltage sources 224, 226 may be adjustable depending upon the needs of control circuit 120. Voltage sources 224, 226 may be adjustable by, for example, control logic 222. Voltage sources 224, 226 may be adjusted dynamically to improve accuracy of discharge current ID so as to dissipate a particular amount of energy in discharge circuit 200. Furthermore, voltage sources 224, 226 may be configured to be adjusted dynamically to change the energy dissipation by transistor 308 when discharge circuit 220 is implemented by discharge circuit 300. Such adjustments of voltage sources 224, 226 may be performed in response to variations of temperature, interference, or other non-ideal changes or operation of control circuit 120.

In FIG. 2, a single instance of discharge circuit 220 is shown that may be configured to dissipate energy in both CIN 106 and COUT 108. However, in various embodiments, separate instances of discharge circuit 220 may be provided in control circuit 120 to separately dissipate energy from CIN 106 and COUT 108, each with a respective input to control circuit 120. Inductor 110 may have a negligible voltage drop for low frequencies such as those likely to be experienced during discharge. Thus, discharge circuit 220 may be able to dissipate the energy of CIN 106 through inductor 110, as described above.

Control circuit 120 is thus configured to discharge the capacitance of a supply line connected to a power supply or other device. Control circuit 120 may utilize high side power switch, such one of as high-side transistors 112, 116, that are already present in a power regulation solution. Control circuit 120 may be configured to utilize the already existing high-side transistors 112, 116 by using such high-side transistors 112, 116 as linear power dissipators. This technique may reduce the cost of implementation by decreasing the silicon area dedicated to the discharge function in the form of discharge circuit 220. The solution lowers the dissipated power in the discharge circuit 220 thus often eliminating the need for dedicated thermal protection. This may increase the ruggedness of control circuit 120. This also may avoid drawbacks of other discharge circuits by reducing the large area needed to dissipate power, avoiding the need of close coupled thermal protection, eliminating risk of uncontrollable increase in input voltage, eliminating risk of saturation of inductor 110, and requiring no additional pins to interface with external elements.

FIG. 5 is an illustration of another system 500 configured to provide power using a line discharge circuit with low power components, according to embodiments of the present disclosure. System 500 may include the application of providing power to a USB element or device. System 500 may include a VIN from a voltage source (not shown) to be applied as a VOUT to USB element or device. A USB power switch may be provided and implemented by transistors 506, 508. VIN may be applied to the drain of transistor 506. VOUT may be provided by the drain of transistor 508. The sources of transistors 506, 508 may be connected to each other. The gates of transistors 506, 508 may be connected to an output of a control circuit 510. The sources of transistors 506, 508 may in turn be connected to an input of control circuit 510. An input capacitor 502 may be formed on the input power line and an output capacitor 504 may be formed on the output power line. Control circuit 510 may be configured to, in a discharge mode, drain one or more of capacitors 502, 504.

Control circuit 510 may be implemented in a manner similar to control circuit 120. Control circuit 510 may include control logic 522 configured to issue control signals to various parts of control circuit 510. Control logic 522 configured to issue a DISCHARGE signal, an nDISCHARGE signal, and a control signal CTL. The DISCHARGE signal may be high when control circuit 510 is in a discharge mode. The nDISCHARGE signal may be high when control circuit 510 is in a regular mode of operation. The CTL signal may be high when control circuit 510 is in a regular mode of operation.

During a regular mode of operation, the CTL signal may be issued to an input of buffer 512, whose output may in turn be routed to gates of transistors 506, 508. Buffer 512 may also receive, at a control input thereof, the nDISCHARGE signal, which during a regular mode of operation (i.e., when the nDISCHARGE signal is high), may enable buffer 512 to provide its output to the gates of transistors 506, 508. During the regular mode of operation, the DISCHARGE signal may be inactive, low, or logical zero, and thus open a switch S1 516 that would otherwise connect a voltage supply 514 to the gates of transistors 506, 508 via a diode 518.

During a discharge mode of operation, the CTL signal may be turned off (i.e., set to low). Furthermore, the nDISCHARGE signal may be low or logical zero (i.e., active low) and thus deactivate buffer 512. Thus, in the discharge mode of operation, the gates of transistors 506, 508 will not receive their input from buffer 512. Instead, the DISCHARGE signal may be active, high, or logical one and close switch S1 516. When switch S1 516 is closed, voltage supply 514 may be configured to provide its value, less a voltage drop across diode 518, which may function as an isolation diode, to the gates of transistors 506, 508. The selection of a value of voltage supply 514, as well as the selection of one or more diodes such as diode 518, may be performed so as to operate transistors 506, 508 in a linear operation region during the discharge mode. This may cause power dissipation in transistors 506, 508 with the remaining power to be dissipated by a discharge circuit 520 of control circuit 510 received through an input 525. Discharge circuit 520 may be implemented by, for example, discharge circuits 220, 300, or 400.

For example, suppose VIN is 20 V and VOUT is also 20 V. Capacitor 502 may be 3000 µF and capacitor 504 may be 10 µF. Current flowing from capacitor 502 through transistor 506 may be given as IDI. Current flowing from capacitor 504 through transistor 508 may be given as IDO. The discharge current ID may be the sum of IDI and IDO. The discharge current ID may be routed to discharge circuit 520 in control circuit 510 through input 525. When capacitors 502, 504 are charged to a given voltage, the sum of IDI and IDO may equal ID with, for non-matched transistors 506, 508, it is not possible to tell individual values of the current in each transistor. Once one of capacitors 502, 504 discharges the voltage on a corresponding transistor decreases until it is approximately the voltage of the source, and then Rds prevents Ids from flowing. Subsequently, the Vgs of the other transistor increases (as its source is being pulled down) thus increasing its current until at the end of the discharge, the current tends to divide such as both 502 and 504 have similar voltages, and continue to discharge in a self-matching manner. If power supply 514 is configured to provide 5 V and diode 518 provides a 0.7 V voltage drop, then the gate (or control terminal) voltage at transistors 506, 508 will be 4.3 V, the voltage drop of transistors 506, 508 may be 17.5 V, meaning that ID is applied to discharge circuit 520 with 2.5 V. The voltage of gates of transistors 506, 508 may be 4.3 V, the Vgs of transistors 506, 508 may be 1.8 V at approximately 100 mA. Thus, the source of transistors 506, 508 may be at 2.5 V, and Vds may thus be 17.5 V. Gate (or control terminal) and source voltages may cause transistors 506, 508 to operate in a linear region of operation. The combination of power to be dissipated from capacitors 502, 504 may be 2.2 W. Transistors 506, 508 may dissipate 1.925 W. Discharge circuit 520 may dissipate 0.275 W.

Figure 6:
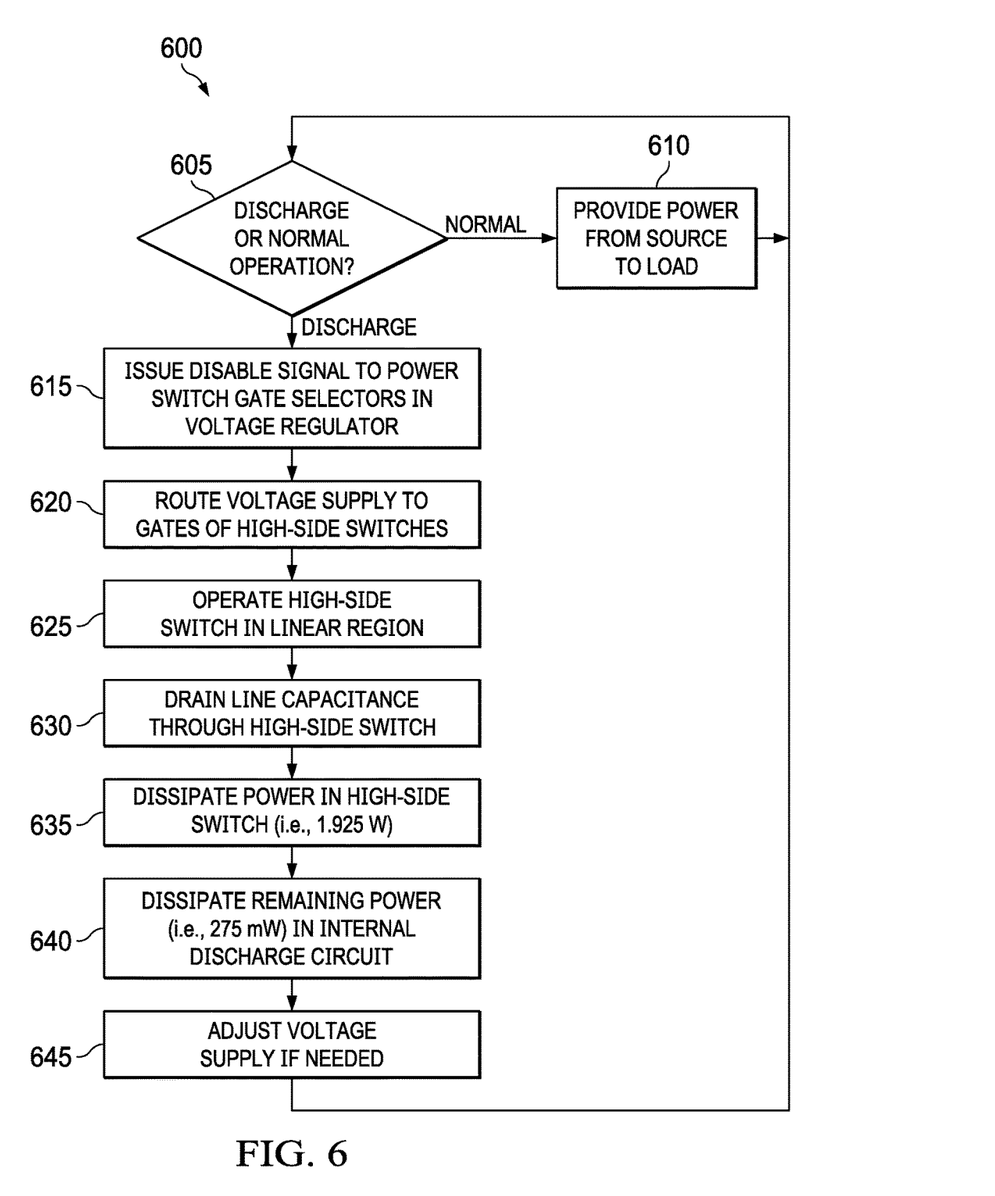
FIG. 6 is an illustration of a method for providing power regulation using a line discharge circuit with low power components, according to embodiments of the present disclosure.

FIG. 6 is an illustration of a method 600 for providing power using a line discharge circuit with low power components, according to embodiments of the present disclosure. Method 600 may be implemented using any suitable mechanisms, such as the systems and circuits of FIGS. 1-5. Method 600 may begin at any suitable point, such as at step 605. Method 600 may be performed using more or fewer steps than shown in FIG. 6. Various steps of method 600 may be omitted, repeated, or performed in parallel with other steps of method 600. For example, steps 640 and 635 may be performed at the same time. Method 600 may optionally repeat or terminate upon any suitable criteria or control mechanism.

At step 605, it may be determined whether the method is to perform a discharge operation or a normal power operation in a power regulator. A normal operation may include converting power or providing a constant power level to a load. A discharge operation may include draining or dissipating energy formed on line capacitances at either input, output, or both. If normal operation is to be used, method 600 may proceed to step 610. If discharge operation is to be used, method 600 may proceed to step 615.

At step 610, power may be provided from a source to a load. The power may be provided in any suitable manner or mode such as buck, boost, or buck-boost. Power may continue to be provided until a criteria is met, such as time, power accumulated, or an outside signal indicating that a mode of operation should change. Method 600 may return to step 605.

At step 615, a disable signal may be issued to power switch gate (or control terminal) selectors in the voltage regulator. The disable signal may cause normal operation of providing power from an input to an output to cease. In one embodiment, as described above in relation to FIGS. 2 and 5, the disable signal may be implemented by setting nDISCHARGE to a low level.

At step 620, a voltage supply may be routed to gates of one or more high-side switches of the power regulator. The voltage supply may be selected so as to operate the switches within a linear region of operation. The voltage supply value may be attenuated by for example passing the voltage supply voltage through one or more diodes before applying the result to the gates of the switches. In one embodiment, as described above in relation to FIGS. 2 and 5, the voltage supply may be routed responsive to an active high DISCHARGE signal.

At step 625, the high-side switches receiving the voltage supply to their respective gates may be operated in a linear region.

At step 630, line capacitances on the input, the output, or both may be drained through the respective high-side switches operating in their linear region.

At step 635, power may be dissipated in the high-side switches according to the linear region operation.

At step 640, any remaining power to be dissipated may be dissipated in an internal discharge circuit.

At step 645, the output value of the voltage supply may be adjusted, if necessary. Such a value may be adjusted so as to assure future operation of the switches in the linear region, or to account for variances caused by interference, temperature changes, or other non-ideal conditions.

Method 600 may return to step 605 or may optionally terminate based on any suitable criteria.

Although example embodiments have been described above, other variations and embodiments may be made from this disclosure without departing from the spirit and scope of these embodiments.

I claim:

1. A control circuit, comprising:
   a discharge circuit;
   a control logic;
   a first output communicatively coupled to a control terminal of a first power transistor, the first power transistor including the control terminal, a first terminal, and a second terminal; and
   an input communicatively coupled to the second terminal of the first power transistor;
   wherein, in a discharge mode of operation:
      the control logic is configured to provide a first control terminal voltage to the control terminal of the first power transistor via the first output, the first control terminal voltage configured to operate the first power transistor in a linear region of operation to dissipate energy stored in a first capacitance connected to the first terminal of the first power transistor; and
      the discharge circuit is configured to:
         receive a discharge current from the second terminal of the first power transistor; and
         dissipate remaining energy undissipated by the first power transistor.

2. The control circuit of claim 1, wherein the first power transistor is external to a die including the control circuit.

3. The control circuit of claim 1, wherein the second terminal of the first power transistor is a source of the first power transistor.

4. The control circuit of claim 1, wherein the discharge circuit is configured to dissipate less energy than the first power transistor is configured to dissipate during operation in the linear region.

5. The control circuit of claim 1, wherein the discharge circuit includes a current source and a pair of transistors configured to mirror a reference current to dissipate the remaining energy.

6. The control circuit of claim 1, wherein the discharge circuit includes a resistor configured to dissipate the remaining energy.

7. The control circuit of claim 1, further comprising a second output communicatively coupled to a control terminal of a second power transistor, the second power transistor including the control terminal, a first terminal, and a second terminal; wherein: the input is further communicatively coupled to the second terminal of the second power transistor through an inductor; and in the discharge mode of operation: the control logic is further configured to provide a second control terminal voltage to the control terminal of the second power transistor, the second control terminal voltage configured to operate the second power transistor in the linear region of operation to dissipate energy stored in a second capacitance connected to the first terminal of the second power transistor; the received discharge current includes components from the output of the first power transistor and the output of the second power transistor; and the discharge circuit is further configured to dissipate remaining energy undissipated by the second power transistor.

8. The control circuit of claim 1, further comprising a voltage source, wherein the control terminal voltage is provided by the control logic as originating from the voltage source.

9. A system, comprising:
a voltage source;
a power regulator circuit configured to convert voltage from the voltage source to a voltage output, the power regulator circuit including:
a first power transistor including a control terminal, a first terminal, and a second terminal; and
a control circuit, including:
a discharge circuit;
a control logic;
a first output communicatively coupled to the control terminal of the first power transistor; and
an input communicatively coupled to the second terminal of the first power transistor;
wherein, in a discharge mode of operation:
the control logic is configured to provide a first control terminal voltage to the control terminal of the first power transistor via the first output, the first control terminal voltage configured to operate the first power transistor in a linear region of operation to dissipate energy stored in a first capacitance connected to the first terminal of the first power transistor; and
the discharge circuit is configured to:
receive a discharge current from the second terminal of the first power transistor; and
dissipate remaining energy undissipated by the first power transistor.

10. The system of claim 9, wherein the first power transistor is external to a die including the control circuit.

11. The system of claim 9, wherein the second terminal of the first power transistor is a source of the first power transistor.

12. The system of claim 9, wherein the discharge circuit is configured to dissipate less energy than the first power transistor is configured to dissipate during operation in the linear region.

13. The system of claim 9, wherein the discharge circuit includes a current source and a pair of transistors configured to mirror a reference current to dissipate the remaining energy.

14. The system of claim 9, wherein the discharge circuit includes a resistor configured to dissipate the remaining energy.

15. The system of claim 9, wherein the control circuit further comprises a second output communicatively coupled to a control terminal of the second power transistor, the second power transistor including the control terminal, a first terminal, and a second terminal; wherein: the input is further communicatively coupled to the second terminal of the second power transistor through an inductor; and in the discharge mode of operation: the control logic is further configured to provide a second control terminal voltage to the control terminal of the second power transistor, the second control terminal voltage configured to operate the second power transistor in the linear region of operation to dissipate energy stored in a second capacitance connected to the first terminal of the second power transistor; the received discharge current includes components from the output of the first power transistor and the output of the second power transistor; and the discharge circuit is further configured to dissipate remaining energy undissipated by the second power transistor.

16. The system of claim 9, wherein the control terminal voltage is provided by the control logic as originating from the voltage source.

17. A method, comprising:
providing a first output communicatively coupled to a control terminal of a first power transistor, the first power transistor including the control terminal, a first terminal, and a second terminal;
providing an input communicatively coupled to the second terminal of the first power transistor;
in a discharge mode of operation:
providing a first control terminal voltage to the control terminal of the first power transistor via the first output, the first control terminal voltage configured to operate the first power transistor in a linear region of operation to dissipate energy stored in a first capacitance connected to the first terminal of the first power transistor; and
receiving a discharge current from the second terminal of the first power transistor;
and
dissipating remaining energy undissipated by the first power transistor.

18. The method of claim 17, wherein the remaining energy undissipated is less energy than the first power transistor is configured to dissipate during operation in the linear region.

19. The method of claim 17, further comprising providing a second output communicatively coupled to a control terminal of a second power transistor, the second power transistor including the control terminal, a first terminal, and a second terminal; wherein: the input is further communicatively coupled to the second terminal of the second power transistor through an inductor; and in the discharge mode of operation: the method further includes providing a second control terminal voltage to the control terminal of the second power transistor, the second control terminal voltage configured to operate the second power transistor in the linear region of operation to dissipate energy stored in a second capacitance connected to the first terminal of the second power transistor; the received discharge current includes components from the output of the first power transistor and the output of the second power transistor; and the method further includes dissipating remaining energy undissipated by the second power transistor.

20. The method of claim 17, wherein the control terminal voltage is provided by the control logic as originating from a voltage source.

* * * * *